United States Patent [19]

Jones et al.

[11] 3,980,004

[45] Sept. 14, 1976

[54] PISTON AND SEAL ASSEMBLIES

[75] Inventors: Peter Jones; Colin McDonald, both of Birmingham, England

[73] Assignee: Girling Limited, Birmingham, England

[22] Filed: Nov. 4, 1974

[21] Appl. No.: 520,649

[30] Foreign Application Priority Data
Nov. 7, 1973 United Kingdom............ 51680/73

[52] U.S. Cl.................................. 92/182; 92/240; 277/29; 277/189; 277/212 C
[51] Int. Cl.²....................... F16J 9/00; F16J 15/00
[58] Field of Search.............. 277/189, 29, 212 C; 92/182, 181, 240, 183, 184, 185, 244; 137/516.15, 516.17, 516.29

[56] References Cited
UNITED STATES PATENTS

| | | | |
|---|---|---|---|
| 2,076,363 | 4/1937 | Brunner...................... | 277/189 X |
| 2,313,271 | 3/1943 | Schnell...................... | 92/240 |
| 3,110,502 | 11/1963 | Pagan...................... | 277/189 |

FOREIGN PATENTS OR APPLICATIONS
197,950  11/1957  Austria........................ 137/516.15

OTHER PUBLICATIONS
Machine Design – Sept. 1944, pp. 126 and 127.

Primary Examiner—Samuel B. Rothberg
Attorney, Agent, or Firm—Scrivener Parker Scrivener and Clarke

[57] ABSTRACT

A piston and seal assembly is adapted to work in a cylinder, particularly a master cylinder of a vehicle braking system, the seal having a lip which sealingly engages the cylinder bore on the pressure stroke, an inner portion mounted on the piston, and an interconnecting portion between the lip and the inner portion. A retaining member holds the seal on the piston and engages the interconnecting portion during the return stroke of the piston so that the seal flexes about the line of engagement between the retaining member and the interconnecting portion to provide a recuperation flow path between the lip and the cylinder bore.

3 Claims, 1 Drawing Figure

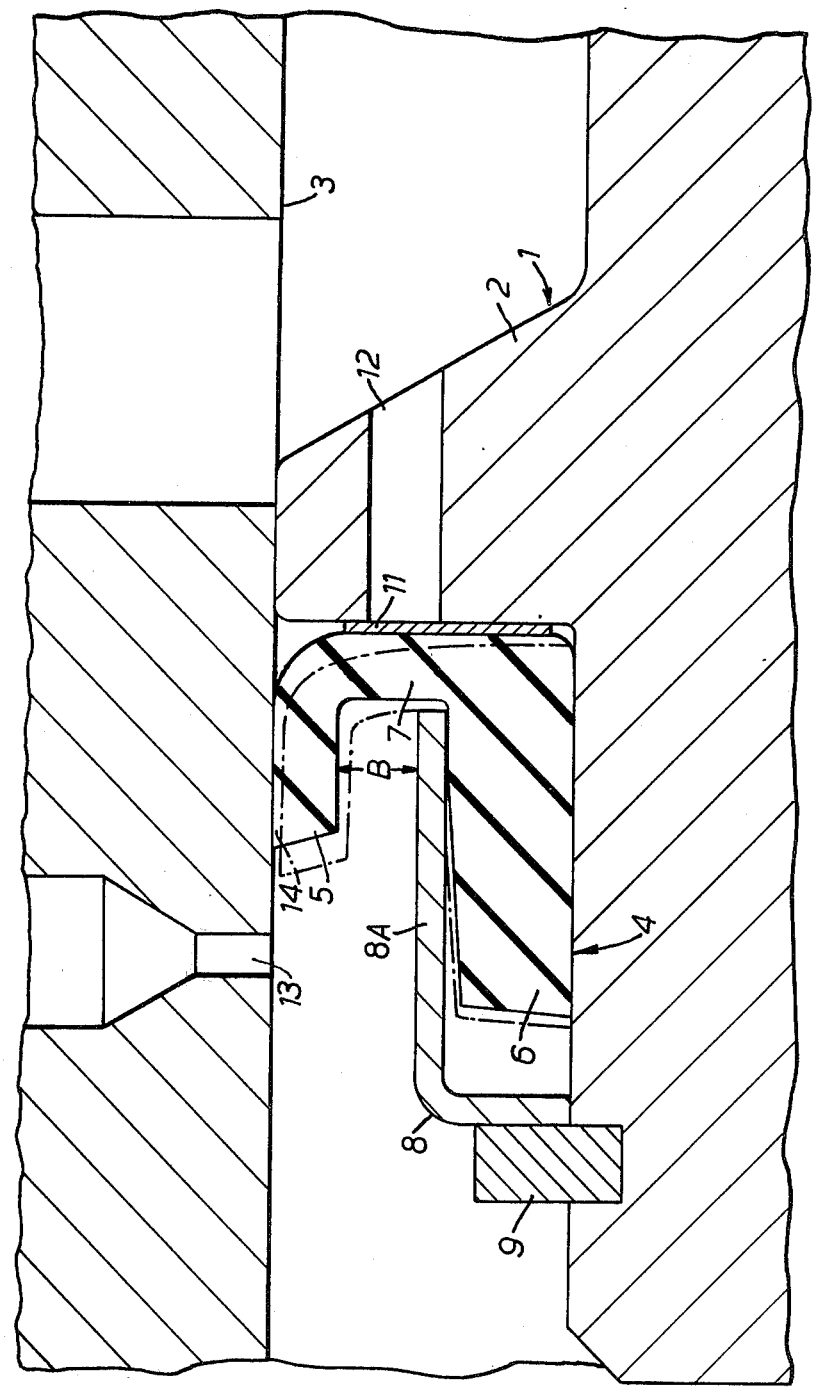

PISTON AND SEAL ASSEMBLIES

This invention relates to piston and seal assemblies adapted to work in cylinders and has particular application to such assemblies for master cylinders of vehicle braking sytems.

In known braking systems depression of the brake pedal moves a piston assembly comprising a piston carrying a lip seal, forwardly in the master cylinder. The seal passes the master cylinder fluid inlet port and fluid contained in a forward chamber is pressurized. During this pressure stroke, the pressure acting on the forward face of the seal urges the lip radially outwardly to seal against the cylinder bore. Release of the pedal returns the piston to its initial position and fluid flows along a recuperation flow path extending between the periphery of the seal and the cylinder bore from the inlet to the forward chamber.

These known piston and seal assemblies have the problems that during the return stroke it is sometimes difficult for sufficient fluid to pass along the recuperation path at the periphery of the seal, particularly in large bore cylinders used for commercial vehicle braking systems. Because insufficient fluid passes along the recuperation path a partial vacuum is set up in the forward chamber. If air is present it tends to be drawn into the forward chamber and this causes considerable difficulties when it is desired to bleed air from the braking system. In addition, any dirt or other particules in the fluid are drawn along the recuperation path and sometimes are entrained between the seal and the bore, there being the possibility that they may score the bore and thereby create a leak path past the seal.

The present invention aims to overcome these problems and provides a piston and seal assembly adapted to work in a cylinder, comprising a piston slidable in the cylinder; a seal mounted on the piston and having an inner portion adjacent the piston, an outer lip portion sealingly engaging the cylinder bore during a pressure stroke of the piston, and an interconnecting portion interconnecting the inner and outer portions; and retaining means retaining the seal on the piston and engaging the interconnecting portion during the return stroke of the piston; wherein the seal flexes about a predetermined line of flexure during the return stroke of the piston to provide a recuperation flow path between the cylinder bore and the lip portion of the seal, the line of flexure being determined by the line of engagement of the retaining means with the interconnecting portion.

In such an assembly the degree of flexure can be adjusted, by varying the distance between the lip portion and the line of flexure, so that sufficient flow through the recuperation path can be ensured to avoid the formation of a vacuum forwardly of the seal and to flush any dirt from there between the lip portion and the cylinder bore.

In the known master cylinders it has been found that when partial vacuum is created, fluid tends to pass between the seal and the piston into the forward chamber. If any dirt is present in that fluid it is trapped between the seal and the piston with the result that a leak path may be created and the seal may not function properly.

In a preferred embodiment of the present invention the retaining means holds the seal in permanent sealing engagement with the piston. Thus, fluid is prevented from passing between the seal and the piston.

Preferably, the seal is permitted a small degree of axial movement relative to the piston so that it engages the retaining means only on the return stroke of the piston. The amount of relative movement permitted effects the degree of flexure of the seal.

A piston and seal assembly in accordance with the invention working in a master cylinder of a vehicle braking system will now be described, by way of example, with reference to the accompanying drawing which shows a scrap sectional view of part of the assembly and cylinder.

The piston and seal assembly comprises the piston 1 slidable in the cylinder bore and having an increased diameter portion 2 defining the side wall of a forward recess in which the annular seal 4 is supported. The seal is generally U-shaped in cross-section, the arms of the U-constituting an outer lip portion 5 and an inner, base portion 6 interconnected by a portion 7. In this assembly, at least the interconnecting portion 7 is flexible.

The seal 4 is held in place by a retainer 8 having an annular axially projecting part 8A extending into the space between the base portion 6 and the lip portion 5 of seal 4. The retainer is located by a circlip 9 mounted in an annular recess in the piston 1 and holds the base portion 6 in sealing engagement with the piston 1 at all times.

An annular support plate 11 is positioned at the rearward face of the seal and prevents seal material being forced into circumferentially spaced axially extending passages 12 formed in the portion 2 of the piston.

In operation, the piston and seal assembly is moved forwardly, to the left as seen in the drawing, under the action of a brake pedal, to pressurize fluid in a forward chamber. During the pressurizing stroke, the seal passes an inlet 13 connecting the cylinder to a fluid reservoir. The seal is urged by fluid pressure towards the piston portion 2 and adopts the position shown in full lines in the drawing, in which it holds the plate 11 against portion 2 to close the passages 12, the lip portion 5 being urged into sealing engagement with the cylinder bore.

Upon return movement of the assembly, the seal moves a small distance axially and adopts the position shown in broken lines, in which the interconnecting portion 7 of the seal is engaged closely adjacent its junction with the base portion 6 by the projecting part 8A of the retainer. The support plate 11 is then clear of the axial passages 12. The seal 4 flexes about its line of engagement with the retainer 8 so that the lip portion 5 moves away from the cylinder bore and a gap 14 is formed between the periphery of the seal and the cylinder bore. Thus, fluid can flow along a recuperating flow path from the rearward side of the piston through the passages 12 and the gap 14 to the forward chamber.

In the above described assembly, the amount of flexing by the seal and thus the size of the gap 14 can be controlled by varying the distance B between the lip portion 5 and the projecting part 8A of the retainer. Thus, the gap can be arranged to permit sufficient flow therethrough to prevent the formation of a vacuum in the forward chamber. Furthermore each individual master cylinder can be modified by adjusting the diameter of the end of projecting part 8A of the retainer, for example, by bending, or by replacing the retainer by one which gives the desired distance B between the projecting part and the lip portion of the seal. It is therefore not necessary to keep in stock seals of different flexibility to meet individual requirements.

The degree of flexing by the seal 4 is also dependent upon the distance between the end of the axially projecting part 8A and the adjacent wall of the interconnecting portion 7 of the seal.

For example, if the projecting part 8A engages the seal 4 to hold it against the plate 11 at all times, the amount by which the seal can flex will be different from that of the illustrated arrangement.

The above described arrangement has the advantage that the seal is less likely to adhere to the cylinder bore than known arrangements if the master cylinder is not used for a considerable time.

The interconnecting portion 7 of the seal is relatively thin and its lateral dimension may be substantially the same as the lip portion 5 and substantially less than the base portion 6.

I claim:

1. A piston and seal assembly adapted to work in a cylinder comprising a piston reciprocably slidable in the cylinder bore to perform a pressure stroke and a return stroke, a seal generally U-shaped in cross section having inner and outer arms interconnected by an interconnecting portion to define a space between said arms, the inner arm engaging said piston and the outer arm defining a lip portion sealingly engaging said cylinder bore during the pressure stroke of said piston, retaining means having an axially extending portion projecting into the space between the arms and engaging said inner arm to hold it in permanent sealing engagement with said piston, said axially extending portion engaging said interconnecting portion during the return stroke of the piston along a line of engagement which is spaced radially inwardly from the lip portion defined by said outer arm, said seal being flexible about a line of flexure determined by said line of engagement of said retaining means with said interconnecting portion so that said seal flexes about said line and establishes a recuperation flow path between said lip portion and said cylinder bore upon the return stroke of the piston, said piston having an enlarged portion which supports one side of said seal, said enlarged portion including means defining at least one axially extending fluid passage, said passage being closed by said seal during said forward stroke of said piston and forming part of said recuperation fluid flow path during said return stroke of said piston.

2. An assembly according to claim 1, wherein said seal is axially movable relative to said piston through a small distance, said interconnecting portion being spaced from said retaining means during said pressure stroke.

3. An assembly according to claim 1, including a support plate positioned between said seal and said axial passages whereby to prevent seal material being forced into said passages during said pressure stroke of said piston.

* * * * *